US010262152B2

(12) United States Patent
Dogu et al.

(10) Patent No.: US 10,262,152 B2
(45) Date of Patent: Apr. 16, 2019

(54) ACCESS CONTROL APPARATUS, COMPUTER-READABLE MEDIUM, AND ACCESS CONTROL SYSTEM

(71) Applicant: FinalCode, Inc., San Jose, CA (US)

(72) Inventors: Toshio Dogu, Tokyo (JP); Noriyuki Takahashi, Tokyo (JP); Takuya Matsumoto, Kanagawa (JP)

(73) Assignee: FinalCode, Inc., San Jose, CA (US)

( * ) Notice: Subject to any disclaimer, the term of this patent is extended or adjusted under 35 U.S.C. 154(b) by 0 days.

(21) Appl. No.: 14/799,581

(22) Filed: Jul. 15, 2015

(65) Prior Publication Data

US 2015/0317488 A1    Nov. 5, 2015

Related U.S. Application Data

(63) Continuation of application No. PCT/JP2014/082718, filed on Dec. 10, 2014.

(30) Foreign Application Priority Data

Dec. 11, 2013  (JP) .................................. 2013-256344

(51) Int. Cl.
*G06F 21/62* (2013.01)
*H04L 29/06* (2006.01)

(52) U.S. Cl.
CPC .......... *G06F 21/6218* (2013.01); *G06F 21/62* (2013.01); *G06F 21/6281* (2013.01); *H04L 63/102* (2013.01); *G06F 2221/0735* (2013.01)

(58) Field of Classification Search
CPC ............. G06F 21/6218; G06F 21/6209; G06F 21/604; G06F 21/121; G06F 21/50;

(Continued)

(56) References Cited

U.S. PATENT DOCUMENTS 6,351,813 B1 * 2/2002 Mooney .............. G06F 12/1408
   380/259
7,577,838 B1 * 8/2009 Rossmann .......... G06F 21/6218
   713/165

(Continued)

FOREIGN PATENT DOCUMENTS

JP    2007-109016 A    4/2007
JP    2007-306261 A    11/2007

(Continued)

OTHER PUBLICATIONS

Extended European Search Report for European Patent Application No. 14869418.5, issued by the European Patent Office dated Jul. 12, 2016.

(Continued)

*Primary Examiner* — Tae K Kim

(57) ABSTRACT

An access control apparatus comprises a control unit that, based on predetermined access control information, restricts access to an electronic file by software that is permitted to access or prohibited from accessing the electronic file. An access control system comprises: an access control apparatus that has a control unit that, based on predetermined access control information, restricts access to an electronic file by software that is permitted to access or prohibited from accessing the electronic file; and a management apparatus that is provided outside the access control apparatus, and provides, to the access control apparatus, at least one of the predetermined access control information and a judgment result based on the predetermined access control information.

9 Claims, 7 Drawing Sheets

(58) Field of Classification Search
CPC .................. G06F 21/577; G06F 21/62; G06F 2221/2141; H04L 63/101
See application file for complete search history.

(56) References Cited

U.S. PATENT DOCUMENTS

| | | | |
|---|---|---|---|
| 2002/0178271 A1* | 11/2002 | Graham .............. | G06F 21/6245 709/229 |
| 2003/0195858 A1 | 10/2003 | Watanabe et al. | |
| 2003/0200459 A1* | 10/2003 | Seeman ................. | G06F 21/10 726/26 |
| 2004/0230806 A1 | 11/2004 | Lisanke | |
| 2009/0129588 A1 | 5/2009 | Takakusu et al. | |
| 2010/0217983 A1 | 8/2010 | Umezuki | |
| 2010/0250925 A1 | 9/2010 | Hiraide et al. | |
| 2012/0192278 A1 | 7/2012 | Kito et al. | |
| 2012/0303827 A1* | 11/2012 | Neystadt .............. | H04L 63/107 709/229 |
| 2013/0117811 A1 | 5/2013 | Phillips | |
| 2013/0238581 A1* | 9/2013 | Franzki ................ | G06F 21/602 707/705 |
| 2013/0290709 A1* | 10/2013 | Muppidi .............. | H04W 12/08 713/168 |
| 2013/0318358 A1 | 11/2013 | Wang | |
| 2014/0033308 A1* | 1/2014 | Sawyer ................ | G06F 21/554 726/23 |
| 2014/0052990 A1 | 2/2014 | Dogu et al. | |
| 2015/0358356 A1* | 12/2015 | Diaz-Tellez ........... | H04L 63/20 726/1 |
| 2015/0358357 A1* | 12/2015 | Diaz-Tellez ........ | G06F 21/6209 726/27 |

FOREIGN PATENT DOCUMENTS

| | | |
|---|---|---|
| JP | 2008-71216 A | 3/2008 |
| JP | 2012-74088 A | 4/2012 |
| JP | 2013-114614 A | 6/2013 |
| TW | 201339884 A | 10/2013 |

OTHER PUBLICATIONS

International Preliminary Report on Patentability for International Application No. PCT/JP2014/082718, issued by the International Bureau of WIPO dated Jun. 23, 2016.
International Search Report for International Application No. PCT/JP2014/082718, issued by the Japan Patent Office dated Feb. 10, 2015.
Office Action for European Patent Application No. 14 869 418.5, issued by the European Patent Office dated Feb. 15, 2017.
Notice of First Office Action for Patent Application No. 201480006222.2, issued by the State Intellectual Property Office of the People's Republic of China (Chinese Patent Office) dated Jul. 3, 2017.
Written Opinion issued for counterpart Singapore Application 11201505602P, issued by Intellectual property office of Singapore dated Apr. 27, 2017.
Written Opinion issued for counterpart Singapore Application 11201505602P, issued by Intellectual property office of Singapore dated Jun. 15, 2017.
Office Action issued for counterpart Taiwanese Application 103143345, issued by the Taiwan Intellectual Property Office dated May 15, 2018.

* cited by examiner

| FILENAME EXTENSION | SOFTWARE NAME | PERMISSION TYPE |
|---|---|---|
| docx | AA Words<br>BB Writer | BASIC SOFTWARE PRIORITIZED |
| xlsx | AA Sheets<br>BB Calc | BASIC SOFTWARE PRIORITIZED |
| jpg | AA Paint | CONTROL SOFTWARE PRIORITIZED |
| ... | ... | ... |

FIG. 3

ACCESS CONTROL APPARATUS, COMPUTER-READABLE MEDIUM, AND ACCESS CONTROL SYSTEM

The contents of the following Japanese and international patent application(s) are incorporated herein by reference:
NO. 2013-256344 filed on Dec. 11, 2013, and
PCT/JP2014/082718 filed on Dec. 10, 2014.

BACKGROUND

1. Technical Field

The present invention relates to an access control apparatus, a program, and an access control system.

2. Related Art

A method for transmitting an encrypted electronic file securely and easily has been known. Such a method uses a management server that manages a decryption password that is required for decryption of the electronic file (for example, please see Patent Literature 1).

[Patent Literature 1] Japanese Patent Application Publication No. 2010-154419

It has not been possible to restrict, based on access control information, access to an electronic file by software that is permitted to access or prohibited from accessing the electronic file.

BRIEF DESCRIPTION OF THE DRAWINGS

FIG. 3 illustrates, in a table format, one example of parameters to be used for a permission condition.

DESCRIPTION OF EXEMPLARY EMBODIMENTS

Hereinafter, (some) embodiment(s) of the present invention will be described. The embodiment(s) do(es) not limit the invention according to the claims, and all the combinations of the features described in the embodiment(s) are not necessarily essential to means provided by aspects of the invention.

Figure 1:
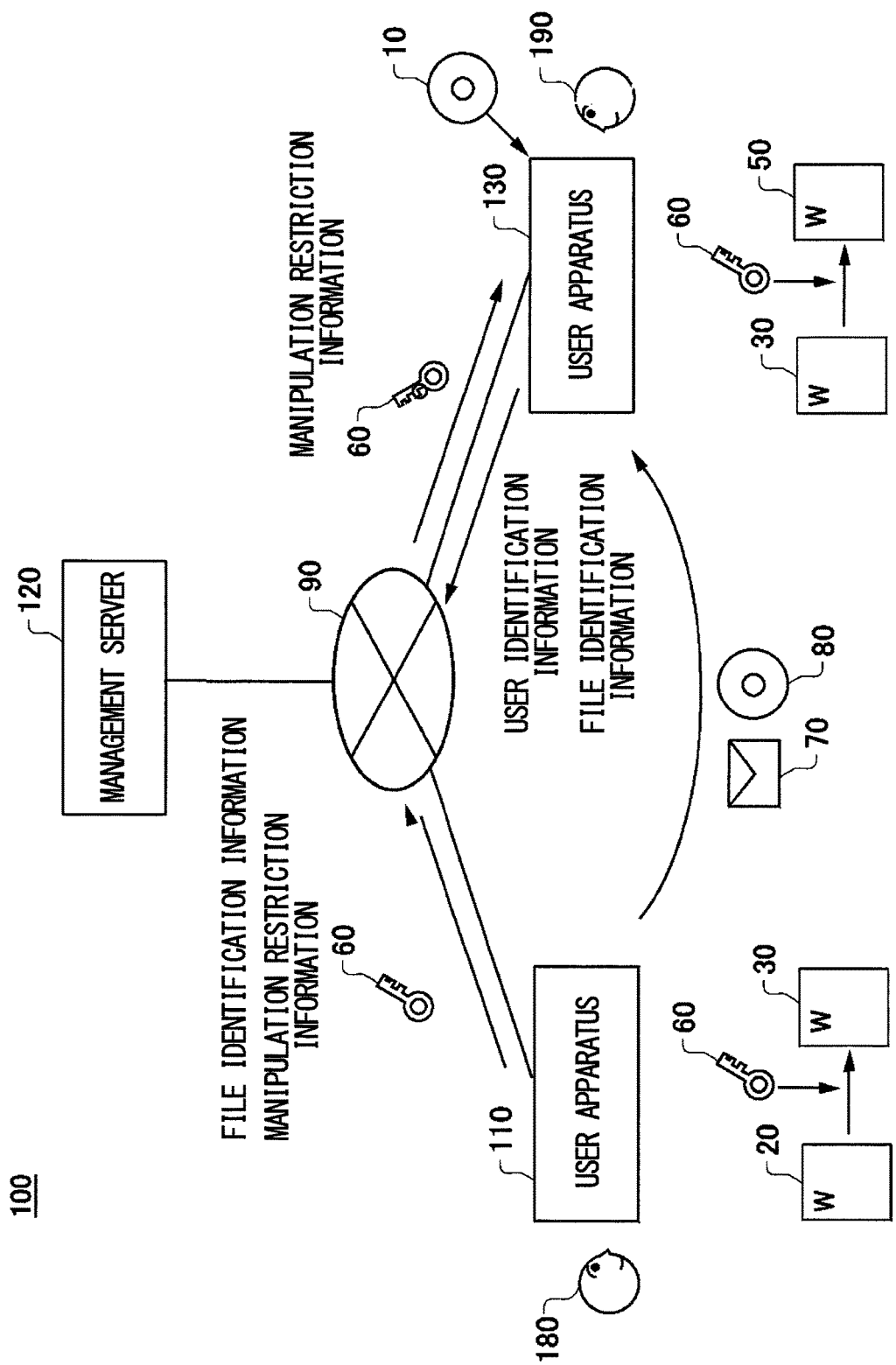
FIG. 1 illustrates one example of an access control system 100 together with a communication network 90.

FIG. 1 illustrates one example of an access control system 100 together with a communication network 90. The access control system 100 provides an IRM (Information Rights Management) function for data such as an electronic file. The access control system 100 comprises a user apparatus 110, a management server 120, and a user apparatus 130. The communication network 90 includes the Internet, for example. The communication network 90 may include a fixed network and a mobile communication network.

The management server 120 is provided outside the user apparatus 110. The management server 120 is provided outside the user apparatus 130. The user apparatus 110, the management server 120, and the user apparatus 130 transmit and receive information via the communication network 90.

The user apparatus 110 may be a personal computer, a mobile telephone terminal, a mobile information terminal, or the like, for example. The user apparatus 130 may be a personal computer, a mobile telephone terminal, a mobile information terminal, or the like, for example.

The user apparatus 130 is one example of an access control apparatus that restricts access to an electronic file based on access control information. Control software 10 for restricting access to an electronic file based on the access control information is installed on the user apparatus 130.

The management server 120 is realized by a computer. The management server 120 is one example of a management apparatus that provides the access control information to the user apparatus 130.

In the present embodiment, a user 180 creates an electronic file 20. The user 180 creates the electronic file by using the user apparatus 110. A user 190 accesses data of the electronic file 20 created by the user 180. For example, the user 190 opens the data of the electronic file 20 by using the user apparatus 130.

The user apparatus 110 creates the electronic file 20 based on an instruction from the user 180. Also, the user apparatus 110 sets access restriction for the data of the electronic file 20 based on an instruction from the user 180. For example, the user 180 designates an access permittee who is permitted to access the data of the electronic file 20. Also, the user 180 designates manipulation contents that the access permittee is permitted to perform or prohibited from performing on the data of the electronic file 20. Examples of manipulation contents that are permitted or prohibited for the data of the electronic file 20 include opening, printing, watermark printing, editing, saving, copying of data to a storage area such as a clipboard, capturing of a display screen, and the like. The user apparatus 110 generates manipulation restriction information including permittee information including user identification information of an access permittee, and manipulation information for identifying permitted or prohibited manipulation contents.

The user apparatus 110 generates an encrypted file 30 by encrypting the electronic file 20 by using a pass phrase 60. The pass phrase 60 may be generated by the user apparatus 110, or may be designated by the user 180. The pass phrase may be sometimes called a password. The encrypted file 30 includes information indicating a filename extension of the electronic file 20, and information specifying file identification information of the electronic file 20. The user apparatus 110 transmits, to the management server 120, file management information including the file identification information for identifying the electronic file 20, the manipulation restriction information, and the pass phrase 60. The management server 120 stores the file management information received from the user apparatus 110.

The user apparatus 110 provides data of the encrypted file 30 to the user 190. For example, the user apparatus 110 transmits, to the user 190, an electronic mail 70 to which the encrypted file 30 is attached, via the communication network 90. Also, the user apparatus 110 records the data of the encrypted file 30 in a non-volatile recording medium 80. In this case, the data of the encrypted file 30 is provided to the user 190 by the recording medium 80 being passed over to the user 190. Also, the user apparatus 110 may store the data of the encrypted file 30 in a shared storage which the user apparatus 110 and the user apparatus 130 can access.

The user apparatus 130 acquires the data of the encrypted file 30 provided from the user apparatus 110. The user apparatus 130 acquires the data of the encrypted file 30 by receiving an electronic mail to which the encrypted file 30 is attached. Also, the user apparatus 130 acquires the data of the encrypted file 30 by reading out the encrypted file 30 from the recording medium 80. The user apparatus 130 acquires the data of the encrypted file 30 by acquiring the data of the encrypted file 30 from the above-described shared storage.

Note that the data of the encrypted file 30 acquired by the user apparatus 130 is identical with the data of the encrypted file 30 created in the user apparatus 110. For this reason, for a purpose of explaining the present embodiment in an easy-to-understand manner, the data of the encrypted file 30 handled in the user apparatus 130 may be sometimes called the "encrypted file 30".

The user apparatus 130 opens the encrypted file 30 according to an instruction from the user 190. At this time, the user apparatus 130 judges whether or not it is in a state that access to the data of the electronic file 20 is permitted, based on at least one of an execution setting of software and an operational state of software. For example, when viewer software used for opening the electronic file obtained by decrypting the encrypted file 30 is software that meets a predetermined permission condition, the user apparatus 130 judges that it is in a state that access is permitted. Also, when software that meets a predetermined denial condition is not in operation on the user apparatus 130, the user apparatus 130 judges that it is in a state that access is permitted. Note that a permission condition and a denial condition are one example of the access control information.

In the explanation of the present embodiment, software that meets a predetermined permission condition may be sometimes called permitted software. Also, software that meets a predetermined denial condition may be sometimes called denied software. Software whose manipulation, like those described above such as opening, can be controlled by the control software 10 is designated as permitted software. For example, software whose IRM function can be managed by the control software 10 is designated as permitted software. In contrast, software whose manipulation, like those described above such as opening, may not be able to be controlled by the control software 10 is designated as denied software. Also, software that performs a data access operation such as an operation of capturing a display screen or an operation of copying data to a clipboard or the like is designated as denied software. When it is judged that it is in a state that access to the data of the electronic file 20 is permitted, the user apparatus 130 requests the pass phrase 60 and the manipulation restriction information from the management server 120, together with the user identification information for identifying the user 190 and the file identification information.

The management server 120 judges whether or not the user 190 is included in access permittees for the data of the electronic file 20 based on the user identification information and the file identification information acquired from the user apparatus 130, and on the permittee information included in the file management information. When the user 190 is judged to be included in the access permittees, the management server 120 transmits the pass phrase 60 and the manipulation restriction information to the user apparatus 130.

Upon receiving the pass phrase 60 and the manipulation restriction information from the management server 120, the user apparatus 130 decrypts the encrypted file 30 by using the received pass phrase 60 to generate a decrypted file 50. The user apparatus 130 opens the decrypted file 50 by using the viewer software under control of the control software 10, and accesses the decrypted file 50 based on the manipulation restriction information received from the management server 120. Thereby, the user apparatus 130 can access the same data as the original data of the electronic file 20.

Due to the control by the control software 10, opening of the decrypted file 50 by viewer software that the control software 10 may not be able to control can be suppressed. Also, access to the data of the decrypted file 50 by software that the control software 10 cannot control or software other than viewer software can be suppressed.

Figure 2:
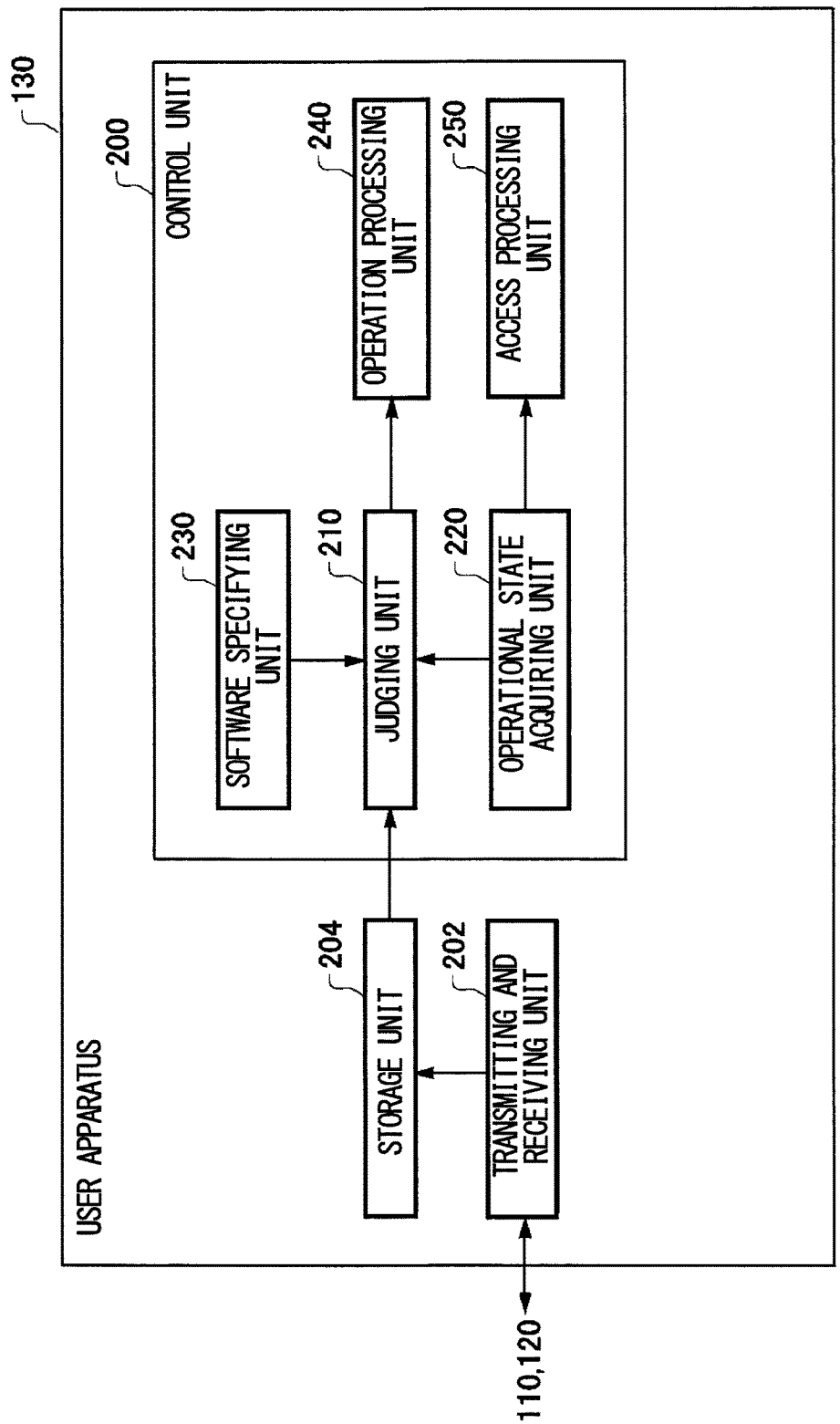
FIG. 2 schematically illustrates one example of a functional block configuration of a user apparatus 130.

FIG. 2 schematically illustrates one example of a functional block configuration of the user apparatus 130. The user apparatus 130 has a control unit 200, a transmitting and receiving unit 202, and a storage unit 204. The control unit 200 is realized by a processor such as an MPU, for example. The transmitting and receiving unit 202 is realized by a communication module such as a network interface, or the like. Note that the transmitting and receiving unit 202 is in charge of communication through the communication network 90. Specifically, the transmitting and receiving unit 202 transmits the user identification information and the file identification information to the management server 120. The transmitting and receiving unit 202 acquires the manipulation restriction information, the pass phrase, and the access control information from the management server 120. The storage unit 204 is realized by a non-volatile storage medium such as a hard disk, or a volatile storage medium such as a RAM. The storage unit 204 stores the access control information received by the transmitting and receiving unit 202.

The control unit 200 has a judging unit 210, an operational state acquiring unit 220, a software specifying unit 230, an operation processing unit 240, and an access processing unit 250. By the control unit 200 operating under control of the control software 10, the user apparatus 130 functions as the judging unit 210, the operational state acquiring unit 220, the software specifying unit 230, the operation processing unit 240, and the access processing unit 250.

The control unit 200 restricts access, to the electronic file, by software that is permitted to access or prohibited from accessing the electronic file, based on predetermined access control information. The access control information includes a permission condition to be met by software that is permitted to be used for accessing the electronic file. Also, the access control information includes a predetermined denial condition to be met by software that is prohibited from accessing the electronic file. In the present embodiment, the permission condition and the denial condition are provided from the management server 120. The storage unit 204 stores the permission condition and the denial condition received from the management server 120.

When software that should be used for accessing the electronic file meets the permission condition, the control unit 200 permits access by the software that meets the permission condition. Specifically, the software specifying unit 230 specifies the software that should be used for accessing the electronic file. For example, the software specifying unit 230 specifies software that should be used for accessing the electronic file, based on a filename extension of the electronic file. The judging unit 210 judges whether or not the software specified by the software specifying unit 230 meets the permission condition stored in the storage unit 204. When the judging unit 210 judges that the software specified by the software specifying unit 230 meets the permission condition, the operation processing unit 240 causes the software that meets the permission condition to start access.

In one example, the permission condition includes a judgment condition that is based on a permitted software name that is a name of software that should be permitted to perform access. In this case, the software specifying unit 230 specifies a name of software that should be used for accessing the electronic file. When a software name that matches the name of the software specified by the software specifying unit 230 is included in permitted software names used for the permission condition, the judging unit 210 judges that the software specified by the software specifying unit 230 meets the permission condition. Note that a name of software is one example of software specifying information for identifying software.

The control unit 200 restricts access by software that meets the denial condition. Also, when software that meets the denial condition is in operation, the control unit 200 restricts access to the electronic file by software that meets the permission condition.

For example, before the software that meets the permission condition starts accessing the electronic file, the control unit 200 judges whether or not software that meets the denial condition is in operation. When it is judged that software that meets the denial condition is in operation, the control unit 200 prohibits software that meets the permission condition from starting accessing the electronic file. Also, when an operation of software that meets the denial condition is detected after software that meets the permission condition starts accessing the electronic file, the control unit 200 restricts the operation of the software that meets the denial condition.

Specifically, before software that meets the permission condition is caused to start accessing the electronic file, the operational state acquiring unit 220 acquires listed information for identifying software that is in operation on the user apparatus 130.

In one example, the denial condition includes a judgment condition that is based on a name of software that should be denied to perform access. For example, the denial condition includes a judgment condition that is based on a prohibited process name that is a name of a process generated when software that should be denied is executed. In this case, the operational state acquiring unit 220 acquires a name of a process currently being executed.

When the name of the process acquired by the operational state acquiring unit 220 is included in one or more prohibited process names used for a prohibition condition, the judging unit 210 judges that software that meets the denial condition is in operation. In this case, the operation processing unit 240 does not cause software that meets the permission condition to start accessing the electronic file. On the other hand, when the name of the process acquired by the operational state acquiring unit 220 is not included in the one or more prohibited process names used for the prohibition condition, the judging unit 210 judges that software that meets the denial condition is not in operation. In this case, the operation processing unit 240 causes software that meets the permission condition to start accessing the electronic file.

Also, when an operation of software that meets the denial condition is detected after software that meets the permission condition start accessing the electronic file, the control unit 200 restricts the operation of the software that meets the denial condition. Specifically, the operational state acquiring unit 220 regularly acquires a name of a process that is being executed even during access to the electronic file. Then, when the judging unit 210 detects, in names of processes acquired by the operational state acquiring unit 220, a process whose name matches any of the one or more prohibited process names used for a prohibition condition, the operation processing unit 240 stops an operation of the detected process.

Note that the denial condition may include an operation condition about contents of an operation performed by software that should be prohibited from performing access. For example, the denial condition may include a judgment condition that is based on whether or not it is software that calls a predetermined, prohibited API. For example, the denial condition may include a judgment condition whether or not software includes a code that calls a predetermined, prohibited API. In this case, when an execution file of the process acquired by the operational state acquiring unit 220 includes a code that calls a predetermined, prohibited API, the judging unit 210 judges that software that meets the denial condition is in operation.

Note that the access processing unit 250 acquires the pass phrase to be used for decryption of the encrypted electronic file from the management server 120, and uses the acquired pass phrase to decrypt the encrypted electronic file. Before the access processing unit 250 decrypts the encrypted electronic file, the judging unit 210 judges, based on the access control information, whether or not to permit access to the decrypted file that is the electronic file obtained by decryption. When the judging unit 210 judges to permit access to the decrypted file, the access processing unit 250 acquires the pass phrase from the management server 120. Then, the access processing unit 250 generates the decrypted file by decrypting the encrypted electronic file by using the pass phrase acquired from the management server 120. Then, the operation processing unit 240 causes software that meets the permission condition to access the generated decrypted file.

Note that the user apparatus 130 accesses the management server 120 to acquire the access control information including the permission condition and the denial condition from the management server 120. The user apparatus 130 may regularly access the management server 120 to acquire the access control information. The user apparatus 130 may access the management server 120 to acquire the access control information when a predetermined event has occurred. For example, when notified by the management server 120, or when notified by the management server 120 that the access control information should be acquired, the access control information may be acquired from the management server 120. The storage unit 204 stores the access control information acquired from the management server 120. The access control information stored in the storage unit 204 is updated with the access control information newly acquired from the management server 120. Note that an access control condition of the management server 120 is updated by an administrator of the management server 120. The access control condition is updated to latest information by the administrator of the management server 120.

FIG. 3 illustrates, in a table format, one example of parameters to be used for the permission condition. The storage unit 204 stores, as parameters to be used for the permission condition, filename extensions of files, software names of permitted software, and permission types in association with each other. The judging unit 210 judges whether or not viewer software is permitted software based on the permission condition that uses the parameters shown in FIG. 3 as a judgment criterion.

"Filename Extension" is one example of information for identifying the type of a file. Note that in the explanation of the present embodiment, the filename extension of a file may be sometimes called simply a "filename extension". Basic software such as an operating system that operates on the user apparatus 130 may sometimes use a filename extension for determining software to be used for opening a file. The setting information of the basic software includes association information that associates software to be used for opening a file with a filename extension. Accordingly, a filename extension is also one example of the association information to be used for association of software to be used for opening a file with the file.

Names of permitted software are stored in "Software Name". Information indicating whether or not the setting of the basic software should be prioritized is stored in "Permission Type". Any of a value indicating "Basic Software Prioritized" and a value indicating "Control Software Prioritized" is stored in "Permission Type".

"Basic Software Prioritized" indicates that association based on the setting information of the basic software is prioritized. Specifically, when the encrypted file 30 is to be opened, the software specifying unit 230 specifies software to be used for opening a decrypted file, based on a filename extension of the decrypted file that is obtained by decryption of the encrypted file 30, and the association information included in the setting information of the basic software. When a name of the software specified by the software specifying unit 230 matches any of names of software that are associated with the filename extension of the decrypted file, the judging unit 210 judges to permit access to data of the decrypted file by using the software specified by the software specifying unit 230. Note that the number of permitted software that are associated with "Basic Software Prioritized" may be one or more. The number of permitted software that are associated with "Basic Software Prioritized" may be two or more.

"Control Software Prioritized" indicates opening by particular software associated with the permission condition irrespective of the setting of the basic software. For example, when a filename extension of an encrypted file is "jpg", the judging unit 210 judges to permit access to data of a decrypted file by using software whose name is "AA Paint". The number of permitted software that is associated with "Control Software Prioritized" may be one. In this case, the judging unit 210 judges to permit access to data of a decrypted file by using one piece of permitted software that is associated with "Control Software Prioritized", under a condition that the one piece of permitted software is installed on the user apparatus 130.

Note that the number of permitted software that are associated with "Control Software Prioritized" may be two or more. In this case, the judging unit 210 specifies one or more pieces of permitted software installed on the user apparatus 130 from among two or more pieces of permitted software that are associated with "Control Software Prioritized", thereby judging to permit access to data of a decrypted file by using the specified one or more pieces of permitted software. When two or more pieces of permitted software associated with "Control Software Prioritized" are installed on the user apparatus 130, the judging unit 210 judges to permit access to data of a decrypted file by using one piece of permitted software from among the two or more pieces of permitted software that are associated with "Control Software Prioritized". At this time, the judging unit 210 may select, based on a predetermined selection condition, the one piece of permitted software that is permitted to access data of a decrypted file from among the two or more pieces of permitted software associated with "Control Software Prioritized". For example, the storage unit 204 stores, as the selection condition, a priority order for selecting respective pieces of permitted software in association with the two or more pieces of permitted software. Based on the selection condition stored in the storage unit 204, the judging unit 210 selects one piece of permitted software whose priority is the highest among the two or more pieces of permitted software installed on the user apparatus 130, as the permitted software that is permitted to access data of a decrypted file. In this manner, one piece of viewer software is specified. Note that the selection condition may be provided from the management server 120 to the user apparatus 130 as a part of the access control information.

Note that a name of permitted software is one example of permitted software specifying information for specifying permitted software. The permitted software specifying information may include information indicating the name of permitted software and the version of the permitted software. Also, the permitted software specifying information may include, in place of or in addition to the name of permitted software, a hash value obtained by hashing a part of an execution file of the permitted software or the like.

Figure 4:
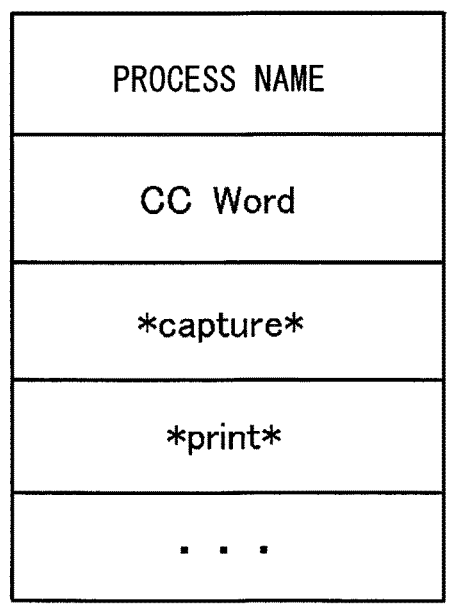
FIG. 4 illustrates, in a table format, one example of parameters to be used for a denial condition.

FIG. 4 illustrates, in a table format, one example of parameters to be used for the denial condition. The storage unit 204 stores process names as a part of parameters used for the denial condition. The judging unit 210 judges an operational state of denied software based on the denial condition that uses the parameters shown in FIG. 4 as a judgment criterion.

Names of processes generated when denied software is executed are stored in "Process Name". A process is an execution unit allocated by the basic software when an execution file of denied software is executed. The process and the execution file are related to each other. The judging unit 210 judges whether or not to permit access to data of a decrypted file based on the denial condition that is based on the parameters stored in the storage unit 204.

For example, when opening the encrypted file 30, the operational state acquiring unit 220 acquires a name of a process currently being executed from the basic software. When the name of the process acquired by the operational state acquiring unit 220 matches any of names of processes stored in "Process Name", the judging unit 210 judges to deny access to data of the electronic file after decryption.

The process name denial condition may include a partial match condition about a character string of a process name. For example, when a parameter "*capture*" in FIG. 4 is used, a program name that is constituted with a character string that includes zero or more characters before "capture" and zero or more characters after "capture" is judged to satisfy the denial condition. In this manner, not only so-called commercial software, but also software that may access data of a decrypted file can be sometimes judged as denied software, by using the denial condition that is based on process names.

Figure 5:
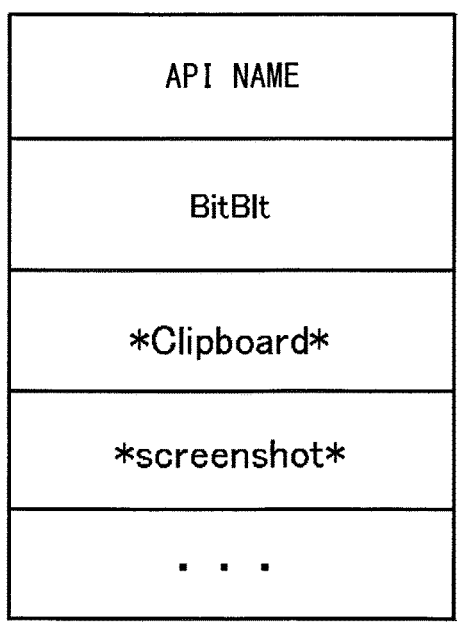
FIG. 5 illustrates, in a table format, one example of parameters to be used for a denial condition.

FIG. 5 illustrates, in a table format, one example of parameters to be used for the denial condition stored in the storage unit 204. The storage unit 204 stores API names as a part of parameters of the denial condition. The judging unit 210 judges an operational state of denied software based on the denial condition that uses the parameters shown in FIG. 5 as a judgment criterion.

Names of APIs (application programming interfaces) to be called up when denied software are execute are stored in "API Name". APIs include an API, a system call, and the like that are provided to external software by the basic software. APIs are one example of a software interface including a function provided as a library, and the like. Note that other than a software interface provided by a library provided as a part of the basic software, software interfaces include a software interface provided by a library provided by a third-party, a software interface provided by a library that is of an individual's own making, or the like.

The judging unit 210 judges whether or not to permit access to data of the electronic file after decrypting the encrypted file 30, based on the denial condition that is based on the parameters about APIs. For example, when an execution file of the process acquired by the operational state acquiring unit 220 calls an API whose name matches a name stored in "API Name", the judging unit 210 judges to deny access to data of a decrypted file. For example, when an execution file of the process acquired by the operational state acquiring unit 220 includes a code that calls an API stored in "API Name", the judging unit 210 judges to deny access to data of a decrypted file.

Note that the API name denial condition may include a partial match condition about a character string of an API name. For example, when a parameter "Clipboard*" in FIG. 5 is used, software that calls an API with an API name that is constituted with a character string that includes zero or more characters before "Clipboard" and zero or more characters after "Clipboard" is judged to satisfy the denial condition. In this manner, not only so-called commercial software, but also software that may access data of a decrypted file can be sometimes judged as denied software, by using the denial condition that is based on API names.

Note that the above-described names of process, and names of API are one example of denied software specifying information for specifying denied software. The denied software specifying information may include a hash value that is obtained by hashing at least a part of an execution file of permitted software. When a hash value that is obtained by hashing a predetermined part of an execution file that is related to a process being executed matches any of hash values stored as the denied software specifying information, the judging unit 210 may judge to deny access to data of the decrypted file.

Also, the denied software specifying information may include information indicating the storage location of an execution file of software. For example, when the directory where an execution file of software is stored is not subordinate to a predetermined directory, the judging unit 210 may judge to deny access to data of a decrypted file. For example, when the directory where an execution file of the process acquired by the operational state acquiring unit 220 is not subordinate to "Program Files" immediately under a predefined drive on which software is installed, the judging unit 210 may judge to deny access to data of a decrypted file.

Figure 6:
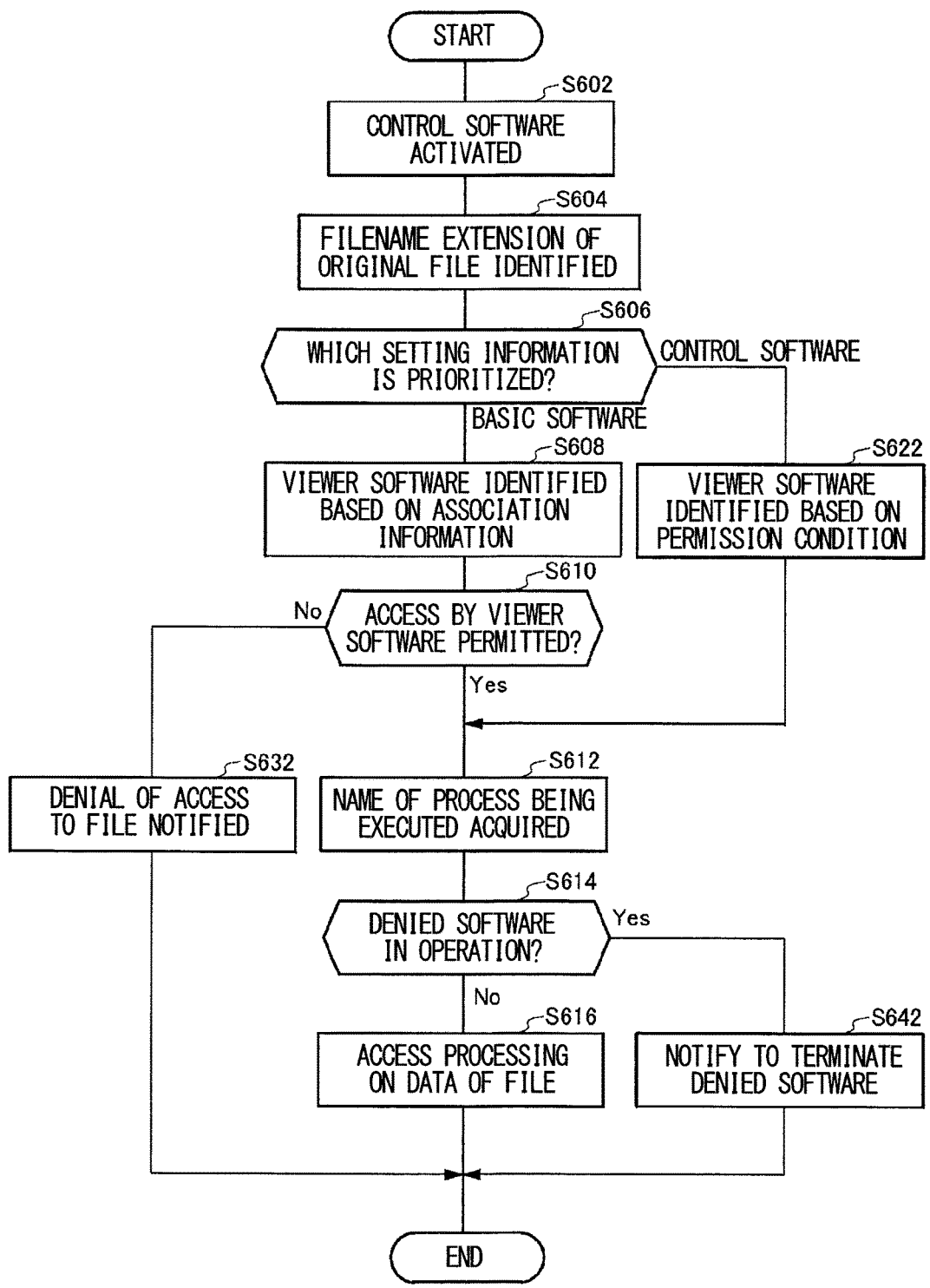
FIG. 6 illustrates one example of a processing flow in the user apparatus 130.

FIG. 6 illustrates one example of a processing flow executed by the user apparatus 130. The processing flow of FIG. 6 is started when the user 190 instructs to open the encrypted file 30. For example, the processing flow of FIG. 6 is started when an icon associated with the encrypted file 30 is double-clicked.

At Step S602, execution of the control software 10 is started. For example, the control software 10 is activated by the basic software. As described above, the setting information of the basic software includes association information between software and filename extensions. Based on the association information of the basic software, a filename extension of an encrypted file is associated with the access control software 10. For this reason, for example when an icon associated with the encrypted file 30 is double-clicked, the basic software designates the encrypted file 30 as a target to be opened, and an execution file of the control software 10 is activated.

At Step S604, the software specifying unit 230 specifies a filename extension of the electronic file 20 before encryption based on the encrypted file 30. For example, when the electronic file 20 is encrypted in the user apparatus 110, the user apparatus 110 generates the encrypted file 30 so that the encrypted file 30 includes filename extension information indicating the filename extension of the electronic file 20 before encryption. The software specifying unit 230 specifies the filename extension of the electronic file 20 before encryption by extracting the filename extension information from the encrypted file 30. Note that the filename extension of the electronic file 20 before encryption matches the filename extension of the decrypted file 50.

At Step S606, the software specifying unit 230 judges, based on the filename extension specified at Step S604, whether to prioritize association based on the setting information of the basic software or prioritize association based on the setting information by the control software 10. For example, when information stored in permission types of the permission condition in association with the filename extension specified at Step S604 is information of "Basic Software Prioritized", the software specifying unit 230 judges to prioritize association based on the setting information of the basic software. On the other hand, when information stored in permission types of the permission condition in association with the filename extension specified at Step S604 is information of "Control Software Prioritized", the software specifying unit 230 judges to prioritize association based on information of the control software 10.

When the software specifying unit 230 judges at Step S606 to prioritize association based on the setting information of the basic software, the process proceeds to Step S608. When the software specifying unit 230 judges to prioritize association based on the setting information of the control software, the process proceeds to Step S622. At Step S622, software identifies by a name stored in "Software Name" in association with the filename extension specified at Step S604 is specified as viewer software. When the processing of Step S622 is completed, the process proceeds to Step S612.

At Step S608, the software specifying unit 230 specifies viewer software based on the filename extension specified at Step S604 and the setting information of the basic software. As described above, the software specifying unit 230 specifies software to be used for opening a file with the filename extension specified at Step S604 based on the association information included in the setting information of the basic software, and determines the specified software as viewer software.

At Step S610, the judging unit 210 judges whether or not it is permitted to access data of a decrypted file by using the viewer software specified at Step S608. Specifically, when the name of the software specified at Step S608 matches any of names of software stored in software names of the permission condition in association with the filename extension specified at Step S604, the judging unit 210 judges that it is permitted to access data of the decrypted file by using the viewer software specified at Step S608.

When it is judged at Step S610 that it is permitted to access the data of the decrypted file by using the viewer software specified at Step S608, the process proceeds to Step S612, and when it is judged that it is not permitted to access the data of the decrypted file by using the viewer software specified at Step S608, the process proceeds to Step S632. At Step S632, it is notified to the user 190 that access, by using the associated software, to the data of the decrypted file is denied, and the operation of the control software 10 is terminated.

At Step S612, the operational state acquiring unit 220 acquires a name of a process currently being executed. Specifically, the operational state acquiring unit 220 acquires, through an API provided by the basic software, the name of the process currently being executed.

At Step S614, the judging unit 210 judges whether or not to permit access to the decrypted file by viewer software, based on the process currently being executed. As a specific judgment process, when a name of at least one process among processes acquired at Step S612 matches any of names of process that are stored in process names of the denial condition, the judging unit 210 judges to deny access to the decrypted file by viewer software. Also, when a code that calls an API whose name matches a name stored in "API Name" of denial condition is included in an execution file of the process acquired at Step S612, the judging unit 210 judges to deny access to the decrypted file by viewer software.

When it is judged at Step S614 to deny access to the data of the electronic file after decryption, the process proceeds to Step S642, and when it is judged not to deny access to the data of the electronic file after decryption, the process proceeds to Step S616. At Step S642, it is notified to the user 190 that data of the decrypted file cannot be accessed, and the operation of the control software 10 is terminated. At this time, the access control software 10, before terminating the operation, presents to the user 190 a name of software whose operation should be terminated, and notifies the user 190 to open the encrypted file 30 after terminating the operation of the presented software.

At Step S616, file access processing on the encrypted file 30 is performed. Step S616 includes access processing on a decrypted file performed according to manipulation by the user 190. When the user 190 performs manipulation of closing the decrypted file, the operation of the control software 10 is terminated.

Figure 7:
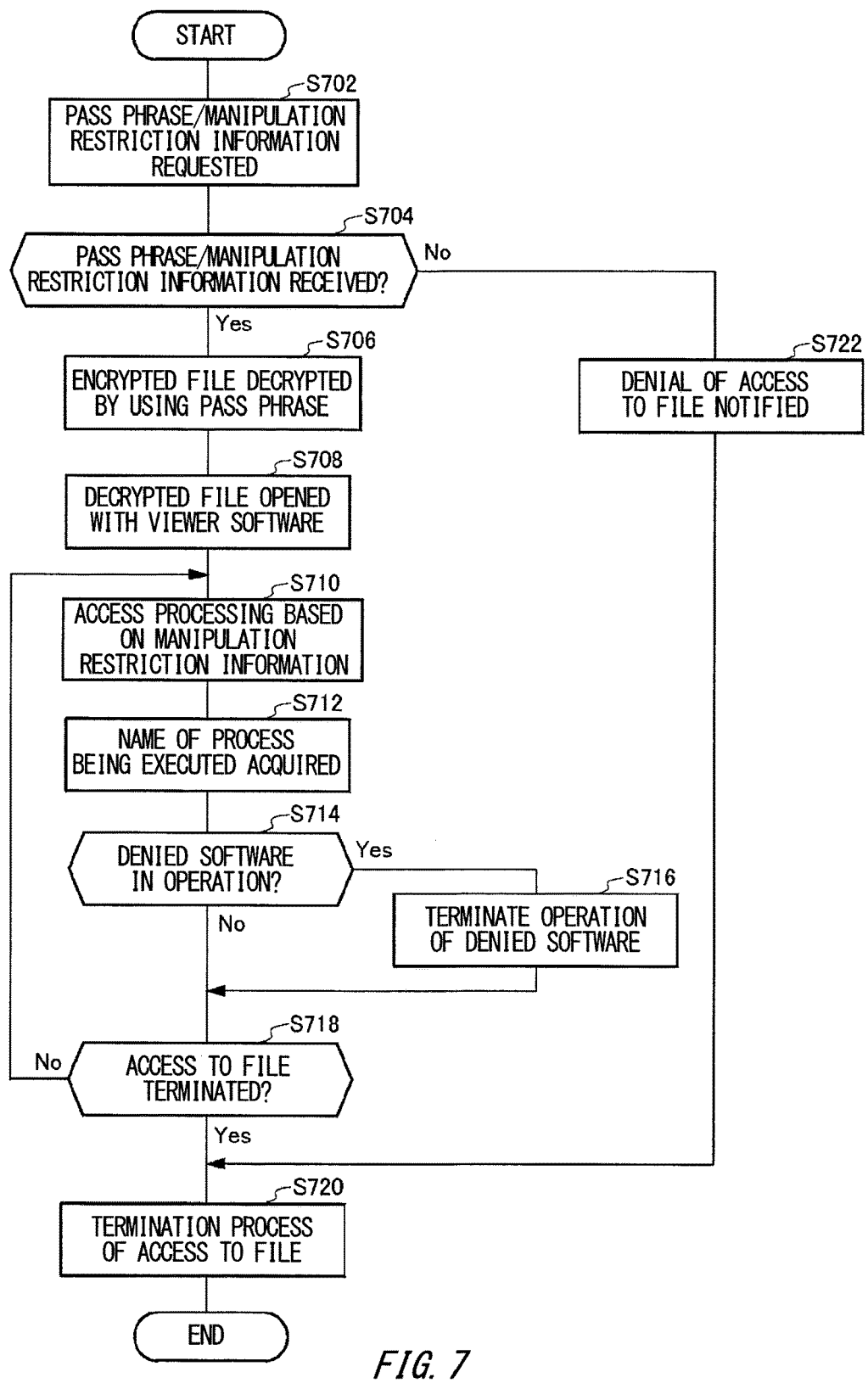
FIG. 7 illustrates one example of a processing flow of access processing in the user apparatus 130.

FIG. 7 illustrates one example of a processing flow of access processing on the encrypted file 30 in the user apparatus 130. The processing flow can be applies to the processing of Step S616 in FIG. 6.

At Step S702, the access processing unit 250 requests, from the management server 120, the pass phrase 60 for decryption of the encrypted file 30 and the manipulation restriction information. Specifically, the access processing unit 250 transmits, to the management server 120, request information for requesting the pass phrase 60 and the manipulation restriction information, along with the user identification information of the user 190 and file identification information specified based on the encrypted file 30.

The management server 120 authenticates the user 190 based on the user identification information received from the user apparatus 130. When having been able to authenticate the user 190, the management server 120 judges whether or not the user 190 is included in access permittees based on the user identification information and the file identification information received from the user apparatus 130, and the manipulation restriction information managed by the management server 120. When having judged that the user 190 is included in the access permittees, the management server 120 transmits, to the user apparatus 130, the pass phrase 60 and the manipulation restriction information stored in the management server 120 in association with the file identification information.

At Step S704, the access processing unit 250 judges whether or not the pass phrase 60 for decryption of the encrypted file 30 and the manipulation restriction information could be receive from the management server 120.

When the access processing unit 250 could not receive the pass phrase 60 and the manipulation restriction information at Step S704, at Step S722, it is notified to the user 190 that information of the decrypted file cannot be accessed, and at Step S720, a process to close the encrypted file 30 is performed, and the operation of the control software 10 is terminated.

When the access processing unit 250 could receive the pass phrase 60 and the manipulation restriction information at Step S704, at Step S706, the access processing unit 250 decrypts the encrypted file 30 by using the pass phrase 60 received from the management server 120 to generate the decrypted file 50.

At Step S708, the operation processing unit 240 opens the decrypted file 50 by using the viewer software specified at Step S608 or Step S622 in FIG. 6. At this time, the operation processing unit 240 may activate the viewer software based on the manipulation restriction information acquired from the management server 120. For example, when having judged that it is necessary to restrict uploading of the decrypted file 50 to a network based on the manipulation restriction information, the operation processing unit 240 may activate the viewer software in an operate mode that does not permit uploading of the decrypted file 50.

At Step S710, the viewer software is caused to access the decrypted file 50 in a state that manipulation of the decrypted file 50 is restricted based on the manipulation restriction information. At Step S710, processing of acquiring the manipulation contents of the user 190 about access to the decrypted file 50, processing of judging, based on the manipulation restriction information, whether or not manipulation of the acquired manipulation contents by the user 190 is permitted, processing of allowing the viewer software to perform only processing according to manipulation permitted for the user 190, and other processing are performed. Note that when there is manipulation that satisfies a predetermined condition, the access processing unit 250 transmits information indicating the manipulation contents to the management server 120 together with the user identification information of the user 190 and the file identification information. The management server 120 stores information indicating the received manipulation contents in association with the user identification information and the file identification information received from the user apparatus 130. With this operation of the access control system 100, a manipulation log indicating what kind of manipulation has been performed by the user 190 on data of the electronic file 20 can be managed for each electronic file 20.

At Step S712, the operational state acquiring unit 220 acquires a name of a process currently being executed. Specifically, the operational state acquiring unit 220 acquires the name of the process currently being executed through an API provided by the basic software, in a similar manner to Step S612.

At Step S714, the judging unit 210 judges, based on the process currently being executed, whether it is necessary to protect the data of the decrypted file 50 from access. The specific judgment process is similar to the processing of Step S614. Specifically, when a name of at least one process among processes acquired at Step S712 matches any of names of processes stored in process names of the denial condition, the judging unit 210 judges that it is necessary to protect the data of the decrypted file 50 from access. Also, when an execution file of the process acquired at Step S712 includes a code that calls an API whose name matches a name stored in "API Name" of the denial condition, the judging unit 210 judges that it is necessary to protect the data of the decrypted file 50 from access.

When the judging unit 210 judges at Step S714 that the data of the decrypted file 50 needs not be protected from access, the process proceeds to Step S718.

When the judging unit 210 judges at Step S714 that it is necessary to protect the data of the decrypted file 50 from access, the operation processing unit 240 terminates the operation of a process that satisfies the denial condition at Step S716. Specifically, the operation processing unit 240 terminates the operation of a process that has a name that matches any of process names of the denial condition. Also, the operation processing unit 240 terminates the operation of a process that relates to an execution file that calls an API whose name matches a name stored in "API Name" of the denial condition. Upon completion of the termination process of a process that meets the denial condition at Step S716, the process proceeds to Step S718.

At Step S718, the access processing unit 250 judges, based on manipulation by the user 190, whether or not there has been an instruction to terminate access to the decrypted file 50. When there has not been an instruction to terminate access to the decrypted file 50, the process returns to Step S710.

When it is judged at Step S718 that there has been an instruction to terminate access to the decrypted file 50, an operation to terminate access processing on the data of the decrypted file 50 is performed at Step S720. Specifically, the access processing unit 250 deletes the decrypted file 50 after viewer software closes the decrypted file 50. Also, the access processing unit 250 transmits a notification that access to the data of the electronic file 20 has been terminated, along with the user identification information and the file identification information. Upon completion of processing to terminate the access processing on the data of the electronic file 20, the operation of the control software 10 is terminated.

Note that, as described above, at Step S714 the judging unit 210 judges whether or not the name of the process acquired at Step S712 matches any of name of processes stored in process names of the denial condition. Also, the judging unit 210 judges whether or not an execution file of the process acquired at Step S712 calls an API whose name matches a name stored in "API Name" of the denial condition. Here, the judging unit 210 may perform judgment at Step S714 on processes that are acquired at Step S712 and exclude the process acquired at Step S612. In this manner, the judging unit 210 may perform the above-mentioned judgment on processes, from among processes acquired at Step S712, that are newly generated after Step S612. Also, the judging unit 210 may perform judgment of Step S714 on a process that is newly generated after immediately preceding judgment.

Note that the processing of Step S612 and the processing of Step S614 may be performed by an execution unit for process monitoring that is different from an execution unit for access processing that accesses the encrypted file 30. The execution unit for process monitoring may perform the processing of Step S612 and the processing of Step S614 regularly. For example, the processing of Step S612 and the processing of Step S614 may be a process for process monitoring that is different from a process for access processing. Also, the processing of Step S612 and the processing of Step S614 may be a thread for process monitoring that is different from a thread for access processing. For example, instead of the processing of Step S612 and Step S614, the execution unit for access processing may acquire information indicating a judgment result of Step S614 from the execution unit for process monitoring, and based on the judgment result indicating information acquired from the execution unit for process monitoring, judge to which of Step S642 and Step S616 the process proceeds. Similarly, instead of the processing of Step S712 and Step S714, the execution unit for access processing may acquire information indicating a judgment result of Step S714 from the execution unit for process monitoring, and judge whether or not to perform the processing of Step S716. Note that the execution unit for process monitoring may perform the processing of Step S716. In this case, the execution unit for access may ask the execution unit for process monitoring to perform the processing to terminate the operation of a process that satisfies the denial condition. Instead of this, while the execution unit for access is performing the processing of and after Step S716, the execution unit for process monitoring may terminate the operation of a process that satisfies the denial condition according to the judgment result of Step S614.

Also, at least one judgment process among the judgment process of Step S610, the judgment process of Step S614, and the judgment process of Step S714 that are performed in the user apparatus 130 by the operation of the control software 10 may be performed by the management server 120, in place of the user apparatus 130. The user apparatus 130 may acquire, from the management server 120, information indicating a result of the judgment process that has been performed by the management server 120. In this case, the user apparatus 130 may transmit, to the management server 120, information that the management server 120 needs for performing these judgment processes. For example, the user apparatus 130 may transmit, to the management server 120, information indicating a name of the viewer software specified at Step S608 or Step S622. Also, the user apparatus 130 may transmit, to the management server 120, information indicating a name of the process specified at Step S612 or Step S712. Thereby, the user apparatus 130 can control access to the encrypted file 30 based on latest permission and denial conditions that are managed at the management server 120.

Note that the permission condition can be considered as being equivalent to a so-called white list about software. Also, the denial condition can be considered as being equivalent to a blacklist about software. For this reason, by means of the access control system 100, access to the data of the electronic file 20 can be controlled based on the white list and blacklist about software.

Note that the encrypted file is one example of an electronic file. In the present embodiment, the access processing on the encrypted file has been explained. However, the access restriction process explained in conjuncture with the present embodiment is not limited to that for the encrypted file, but may be applied to an un-encrypted electronic file. Also, the access restriction process explained in conjunction with the present embodiment is not limited to that for data of an electronic file, but may be applied to various data or information.

The processing that has been explained as an operation of the control unit 200 in the above-described explanation is realized by a processor controlling each hardware provided to the user apparatus 130 according to programs such as the control software 10 and the basic software. In other words, the processing of the user apparatus 130 that has been explained in conjunction with the user apparatus 130 of the present embodiment can be realized by a processor operating according to a program and controlling each hardware, and by each hardware, including the processor, a memory, and the like, cooperating with the program. In other words, the process can be realized by a so-called computer. The computer may perform the process by loading a program for controlling execution of the above-described processing and operating according to the program that has been read in. The computer can load the program from a computer-readable recording medium that stores the program.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

What is claimed is:

1. An access control apparatus comprising:
   a control unit that, based on predetermined access control information, restricts access to an electronic file by software that is permitted to access or prohibited from accessing the electronic file by using control software; wherein
   the access control information includes a predetermined first condition to be met by a permitted software permitted to be used for the access, and a predetermined second condition to be met by a denied software prohibited from performing the access,
   the control software initiates operation based on requested access to the electronic file,
   before the permitted software starts accessing the electronic file, the control unit judges whether or not the denied software is in operation, and when it is judged that the denied software is in operation, prohibits the permitted software from starting accessing the electronic file,
   the control software does not restrict operation of the denied software except when the control software is in operation,
   when an operation of the denied software is detected after the permitted software has accessed the electronic file and while the permitted software is processing the electronic file, the control unit restricts the operation of the denied software, and the control unit does not restrict the operation of the denied software except for while the control software is in operation, and
   after the permitted software closes the electronic file, the control software is terminated.

2. The access control apparatus according to claim 1, wherein
   before access to the electronic file is started, the control unit judges whether or not software that should be used for the access to the electronic file is the permitted software; when the software that should be used for access to the electronic file is the permitted software, and the denied software is not in operation, the control unit permits the permitted software to start accessing the electronic file; and when the denied software is in operation, the control unit prohibits the permitted software from starting accessing the electronic file.

3. The access control apparatus according to claim 1, wherein the second condition includes a condition about contents of an operation performed by software that should be prohibited from performing the access.

4. The access control apparatus according to claim 3, wherein the second condition includes a condition about at least one operation among an operation of calling a predetermined API, an operation of capturing a display screen, and an operation of copying data to a storage area.

5. The access control apparatus according to claim 4, wherein
   when it is judged, based on the second condition, that software that performs the at least one operation is in operation, the control unit restricts the access by the permitted software.

6. The access control apparatus according to claim 1, further comprising:
   a pass phrase-acquiring unit that acquires, from an external management apparatus, a pass phrase to be used for decryption of an encrypted electronic file; and
   a decrypting unit that decrypts the encrypted electronic file by using the pass phrase acquired by the pass phrase-acquiring unit, wherein
   before the decrypting unit decrypts the encrypted electronic file, the control unit judges, based on the predetermined access control information, whether or not to permit access to the electronic file decrypted by the decrypting unit, and when it is judged to permit access to the electronic file decrypted by the decrypting unit, causes the pass phrase-acquiring unit to acquire the pass phrase from the management apparatus, and causes the decrypting unit to decrypt the encrypted electronic file by using the pass phrase.

7. The access control apparatus according to claim 1, further comprising:
   a pass phrase-acquiring unit that acquires, from an external management apparatus, a pass phrase to be used for decryption of an encrypted electronic file; and
   a decrypting unit that decrypts the encrypted electronic file by using the pass phrase acquired by the pass phrase-acquiring unit, wherein
   before the decrypting unit decrypts the encrypted electronic file, the control unit judges whether or not software that should be used for access to an electronic file decrypted by the decrypting unit is the permitted software, and when the software that should be used for access to the electronic file decrypted by the decrypting unit is the permitted software, and the denied software is not in operation, the control unit causes the pass phrase-acquiring unit to acquire the pass phrase from the management apparatus, and causes the decrypting unit to decrypt the encrypted electronic file by using the pass phrase.

8. A non-transitory computer-readable medium having stored thereon a program that causes a computer to perform operations comprising:
   restricting, based on predetermined access control information, access to an electronic file by software that is permitted to access or prohibited from accessing the electronic file by using control software; wherein the access control information includes a predetermined first condition to be met by a permitted software permitted to be used for the access and a predetermined second condition to be met by a denied software prohibited from performing the access, the control software initiates operation based on requested access to the electronic file, before the permitted software starts accessing the electronic file, the control unit judges whether or not the denied software is in operation, and when it is judged that the denied software is in operation, prohibits the permitted software from starting accessing the electronic file, the control software does not restrict operation of the denied software except when the control software is in operation, and when an operation of the denied software is detected after the permitted software has accessed the electronic file and while the permitted software is processing the electronic file, the operation of the denied software is prohibited from performing the access to the electronic file, and the control unit does not restrict the operation of the denied software except for while the control software is in operation, and after the permitted software closes the electronic file, the control software is terminated.

9. An access control system comprising:

the access control apparatus according to claim 1; and a management apparatus that is provided outside the access control apparatus, and provides, to the access control apparatus, at least one of the predetermined access control information and a judgement result based on the predetermined access control information.

* * * * *